(12) United States Patent
Maret

(10) Patent No.: US 6,409,130 B1
(45) Date of Patent: Jun. 25, 2002

(54) PIVOTING SUSPENSION SEAT POST FOR A BICYCLE SEAT

(76) Inventor: Kevin L. Maret, 2111 Atwood La., Lincoln, NE (US) 68521

( * ) Notice: Subject to any disclaimer, the term of this patent is extended or adjusted under 35 U.S.C. 154(b) by 0 days.

(21) Appl. No.: 09/651,762

(22) Filed: Aug. 30, 2000

Related U.S. Application Data

(60) Provisional application No. 60/151,978, filed on Sep. 1, 1999.

(51) Int. Cl.[7] ............................................... A47B 96/06
(52) U.S. Cl. ................. 248/219.2; 280/283; 297/195.1; 248/58
(58) Field of Search ............................. 248/219.2, 560, 248/577, 584, 594, 602; 297/201, 202, 195.1; 280/283

(56) References Cited

U.S. PATENT DOCUMENTS

| | | | | |
|---|---|---|---|---|
| 5,464,271 A | * | 11/1995 | McFarland | 280/283 X |
| 5,489,139 A | * | 2/1996 | McFarland | 280/283 X |
| 5,855,410 A | * | 1/1999 | Lin | 248/219.2 X |
| 6,070,895 A | * | 6/2000 | Newman et al. | 280/283 |
| 6,113,057 A | * | 9/2000 | Cheng | 280/283 X |
| 6,139,039 A | * | 10/2000 | Becker | 280/283 |
| 6,206,396 B1 | * | 3/2001 | Smith | 280/283 |
| 6,270,065 B1 | * | 8/2001 | Hals | 280/283 X |

OTHER PUBLICATIONS

US 2001/0026059 A1; Pub Date Oct. 4, 2001; inventor Jerry Smith.*

* cited by examiner

Primary Examiner—Ramon O. Ramirez
(74) Attorney, Agent, or Firm—Thomte, Mazour & Niebergall; Dennis L. Thomte

(57) ABSTRACT

A pivoting suspension seat post comprising a tubular post which is adapted to be inserted into a bicycle frame tube for supporting a bicycle seat thereon. A lower body member is secured to the upper end of the post and has the lower ends of front and rear parallel arms pivotally secured thereto. An angular upper body member is pivotally secured to the upper ends of the front and rear parallel arms. A pin is pivotally secured at its upper end to the front parallel arm and has its lower end in engagement with a suspension guide which is slidably received in the upper end of the post. A spring or elastomer members are positioned in the post with the upper end of the spring or the elastomers being received by the suspension guide. A seat mount is provided at the upper end of the upper body member for mounting a bicycle seat thereon. The downward and rearward pivotal movement of the upper body member and the bicycle seat operatively secured thereto is resisted by the spring or elastomer members in the post.

16 Claims, 4 Drawing Sheets

PIVOTING SUSPENSION SEAT POST FOR A BICYCLE SEAT

CROSS-REFERENCE TO RELATED APPLICATION

This application claims the benefit of U.S. Provisional Application Ser. No. 60/151,978 entitled A PIVOTING SUSPENSION SEAT POST filed Sep. 1, 1999, the disclosure of which is hereby incorporated herein by reference.

BACKGROUND OF THE INVENTION

1. Field of the Invention

This invention relates to a seat post for a bicycle seat and more particularly to a pivoting suspension seat post for a bicycle seat.

2. Description of the Related Art

Many types of suspension seat posts have been previously provided for bicycle seats in an effort to reduce the shock imparted to the rider's seat. One type of suspension seat post that has been previously provided is what is called a pivoting seat post. In the prior art device, an elastomer material is provided between the parallel arms which results in less than optimum performance. Further, the prior art devices do not have the desired maximum adjustability. Yet another disadvantage of the prior art pivoting suspension seat posts is that they are quite large and experience considerable wear.

SUMMARY OF THE INVENTION

A pivoting suspension seat post is provided which is adapted to be inserted into a bicycle frame tube for supporting a bicycle seat thereon. The suspension seat post of this invention comprises a tubular post having upper and lower ends with a lower body member secured to the upper end of the post. The lower body member has a forward end, a rearward end, first and second sides, and upper and lower ends. Front and rear parallel arms are provided which also have upper and lower ends. The lower end of the front parallel arm is pivotally secured to the lower body member at the upper forward end thereof and extends upwardly and rearwardly therefrom. The lower end of the rear parallel arm is pivotally secured to the lower body member at the lower rearward end thereof and extends upwardly and rearwardly therefrom. An angular upper body member is provided and has the upper ends of the front and rear parallel arms pivotally secured thereto. The upper body member includes an upper forward end and a lower rearward end. The upper forward end of the upper body member is pivotally secured to the upper end of the front parallel arm. The lower rearward end of the upper body member is pivotally secured to the upper end of the rear parallel arm. A seat mounting means, which is adjustable, is provided on the upper body member. A resilient means such as a coil spring or a plurality of elongated elastomer damping members is positioned in the interior of the post. An end cap is adjustably secured to the lower end of the post for preloading the resilient or damping means. An elongated pin has its upper end pivotally secured to the front parallel arm between the upper and lower ends thereof and has its lower end in operative engagement with a suspension guide which embraces the upper end of the resilient means or the damping means whereby downward and rearward movement of the upper body member and the seat mounted thereon is yieldably resisted by the resilient means or the damping means.

A principal object of the invention is to provide a pivoting suspension seat post for a bicycle seat.

It is a further object of the invention to provide a pivoting suspension seat post for a bicycle seat which has maximum adjustability.

Yet another object of the invention is to provide a pivoting suspension seat post for a bicycle which is durable in use.

Yet another object of the invention is to provide a pivoting suspension seat post for a bicycle seat which is relatively compact.

These and other objects will be obvious to those skilled in the art.

DESCRIPTION OF THE PREFERRED EMBODIMENT

Figure 1:
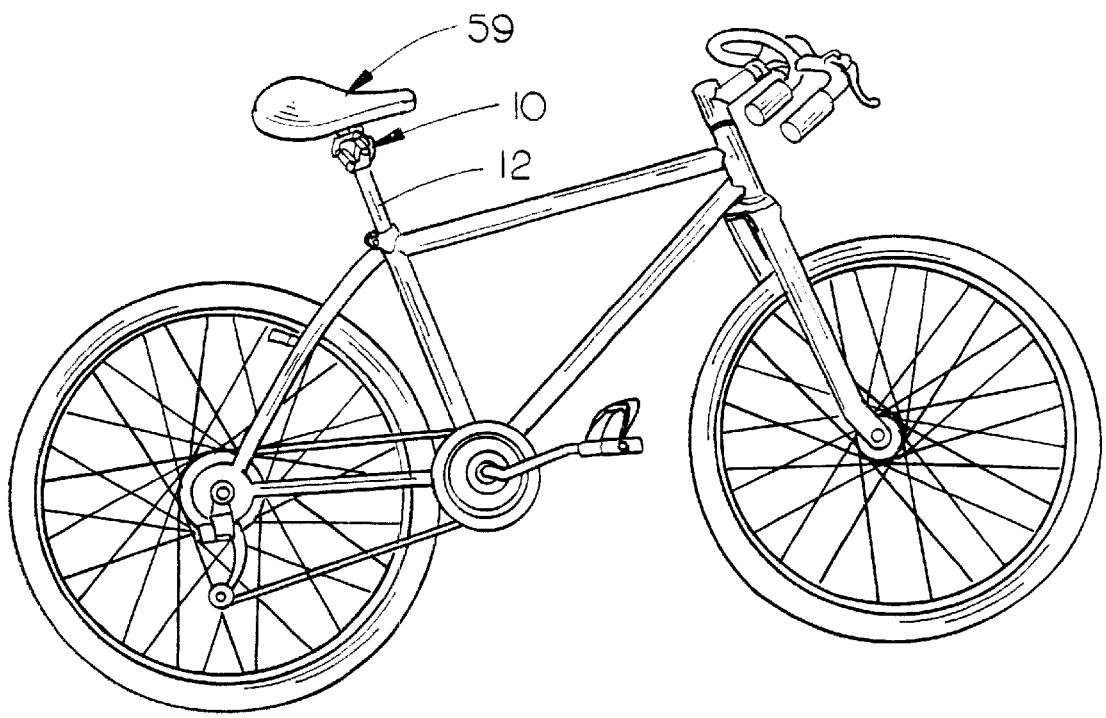
FIG. 1 is a perspective view illustrating the invention mounted on a bicycle.
Figure 2:
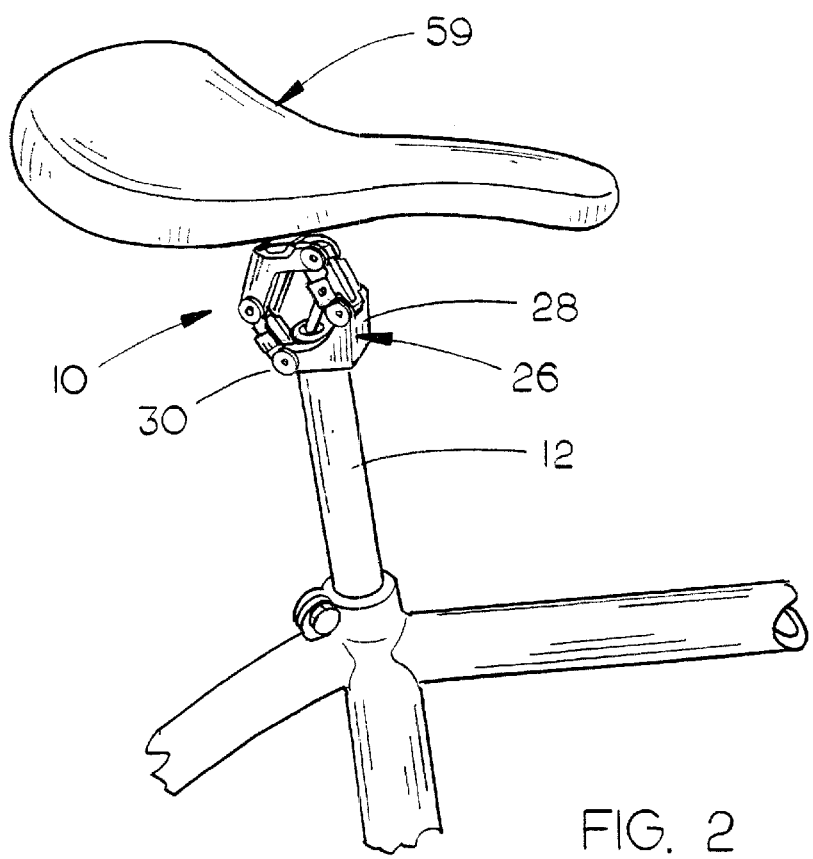
FIG. 2 is a partial perspective view illustrating the invention mounted on a bicycle.
Figure 3:
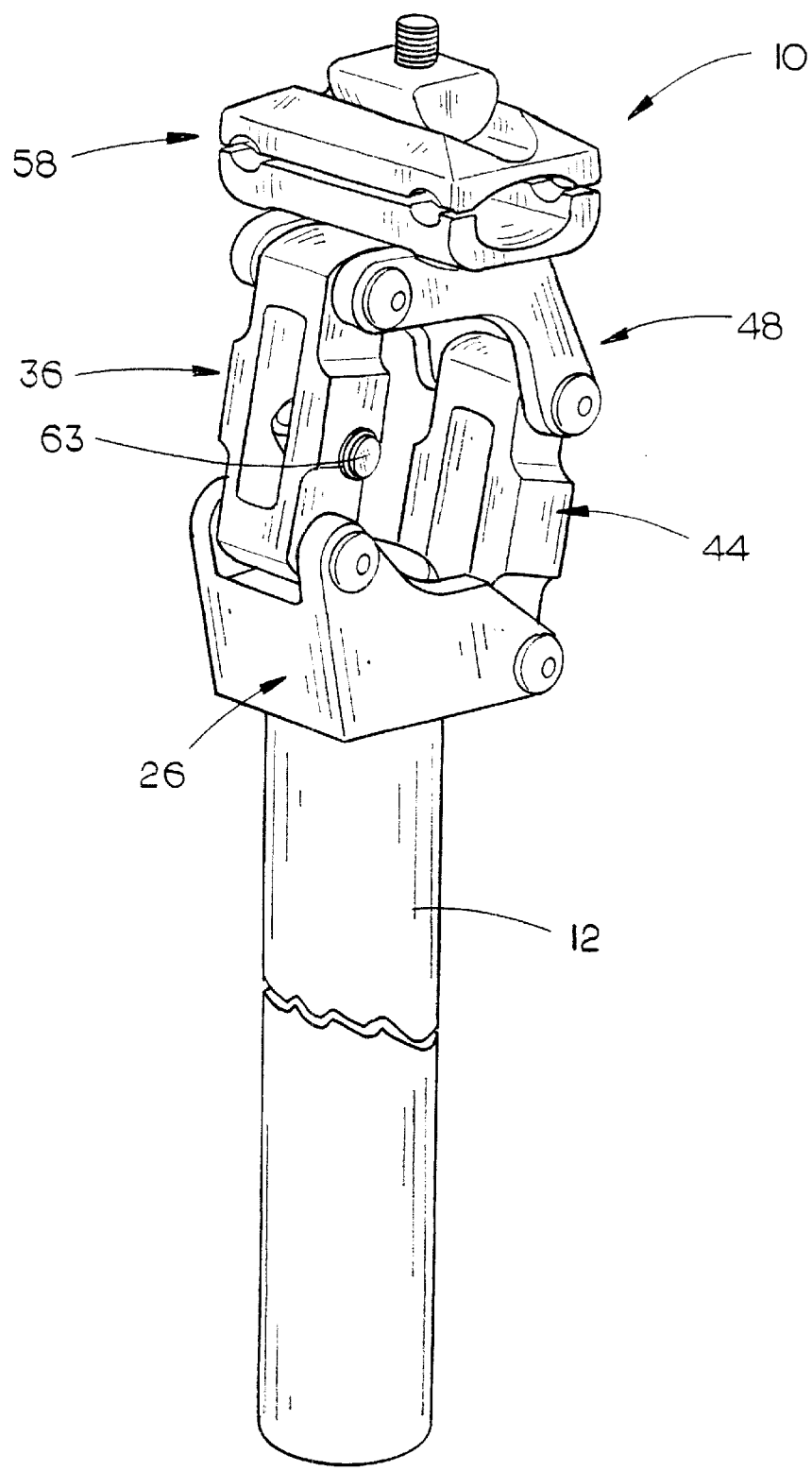
FIG. 3 is a perspective view of the invention.

The suspension seat post of this invention is referred to generally by the reference numeral 10 and includes a tubular post 12 having an internal bore 14 extending therethrough. The lower end of the post 12 is internally threaded at 15 for threadably receiving a preload end cap 16.

Figure 5:
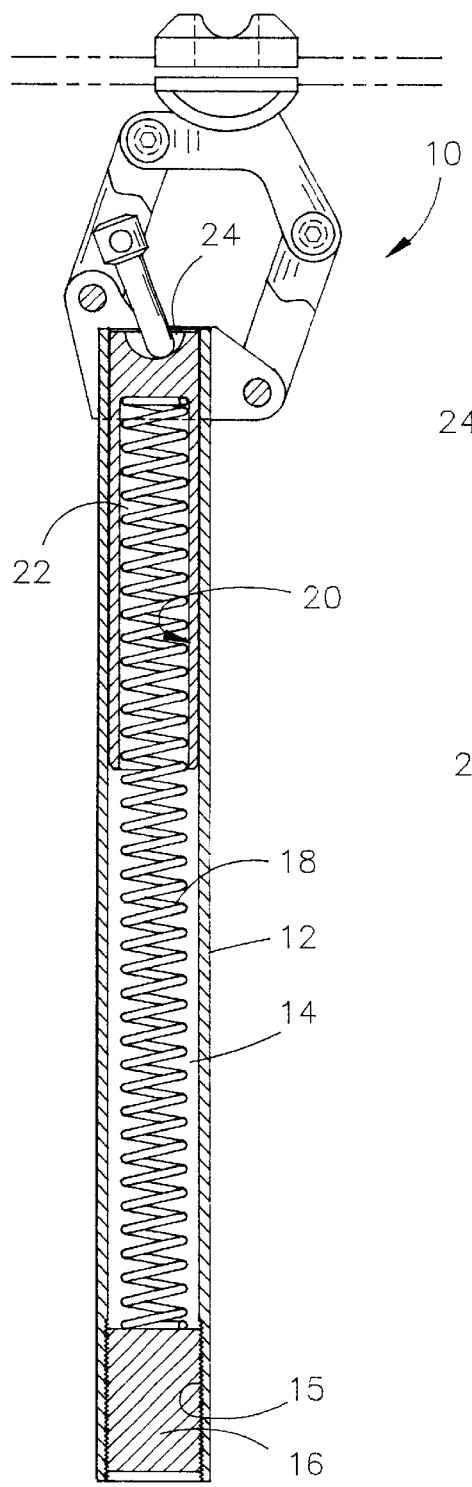
FIG. 5 is a side elevational view of the pivoting suspension seat post of this invention with portions thereof cut away.

In one form of the invention, an elongated coil spring 18 is positioned in bore 14 to serve as a resilient means or as a damping means. In another form of the invention, a plurality of elongated elastomer damping members are utilized in the bore 14. In yet another embodiment of the invention, the elastomer damping members may be used in combination with the spring 18. In any event, a plastic suspension guide 20 is slidably received in the upper end of the bore 14 and has an internal bore 22 extending upwardly thereinto from the bottom thereof which is adapted to receive the upper end of the spring 18 or the elastomer damping members. The upper end of the plastic suspension guide 20 has a recessed portion 24 formed therein, as seen in FIG. 5 and as will be described in more detail hereinafter.

Figure 4:
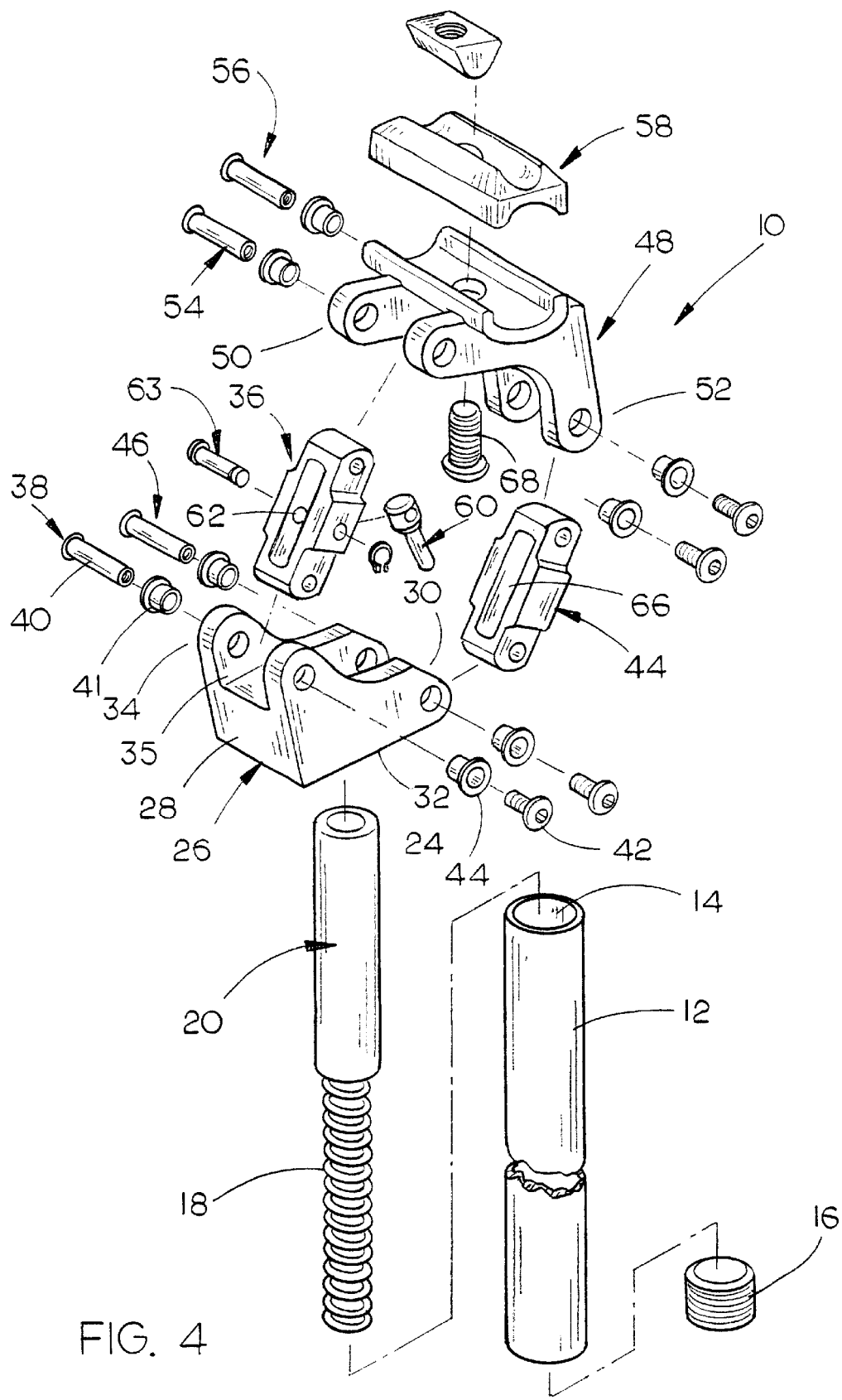
FIG. 4 is an exploded perspective view of the invention.

The numeral 26 refers to a lower body member which is secured to the upper end of the post 12 by any convenient means. For purposes of description, lower body member 26 will be described as having a forward end 28, rearward end 30, lower end 32 and upper end 34. The upper forward end of lower body member 26 is provided with a recessed area 35 which is adapted to receive the lower end of front parallel arm 36. Pivot pin 38 extends through the upper forward end of the lower body member 26 to pivotally secure the lower end of the front parallel arm 36 thereto, as seen in the drawings. As seen in FIG. 4, pivot pin 38 is comprised of a female pivot pin member 40 and a male pivot pin member 42. Bushings 41 are also utilized, as seen in FIG. 4.

A rear parallel arm 44 has its lower end pivotally secured to the lower rearward end of lower body member 26 by pivot pin 46 which is identical to pivot pin 38. The upper ends of parallel arms 36 and 44 are pivotally connected to an angular upper body member 48 which is angular in configuration and which has an upper forward end 50 and a lower rearward end 52. The upper end of front parallel arm 36 is pivotally connected to the upper body member 48 by means of pivot pin 54 which is identical to pivot pin 38. The lower rearward end of upper body member 48 is pivotally connected to the upper end of rear parallel arm 44 by pivot pin 56 which is also identical to pivot pin 38.

The numeral 58 refers to a seat mounting means which is selectively adjustably mounted on the upper end of upper body member 48 and which is adapted to have a bicycle seat 59 mounted thereon.

The numeral 60 refers to a pin having its upper end pivotally secured to front parallel arm 36 intermediate the ends thereof with the pivotal connection being identified by the reference numeral 62 and the pivot pin being identified with the reference numeral 63. The lower end of pin 60 is received in the recessed area 24 of the suspension guide 20.

Figure 6:
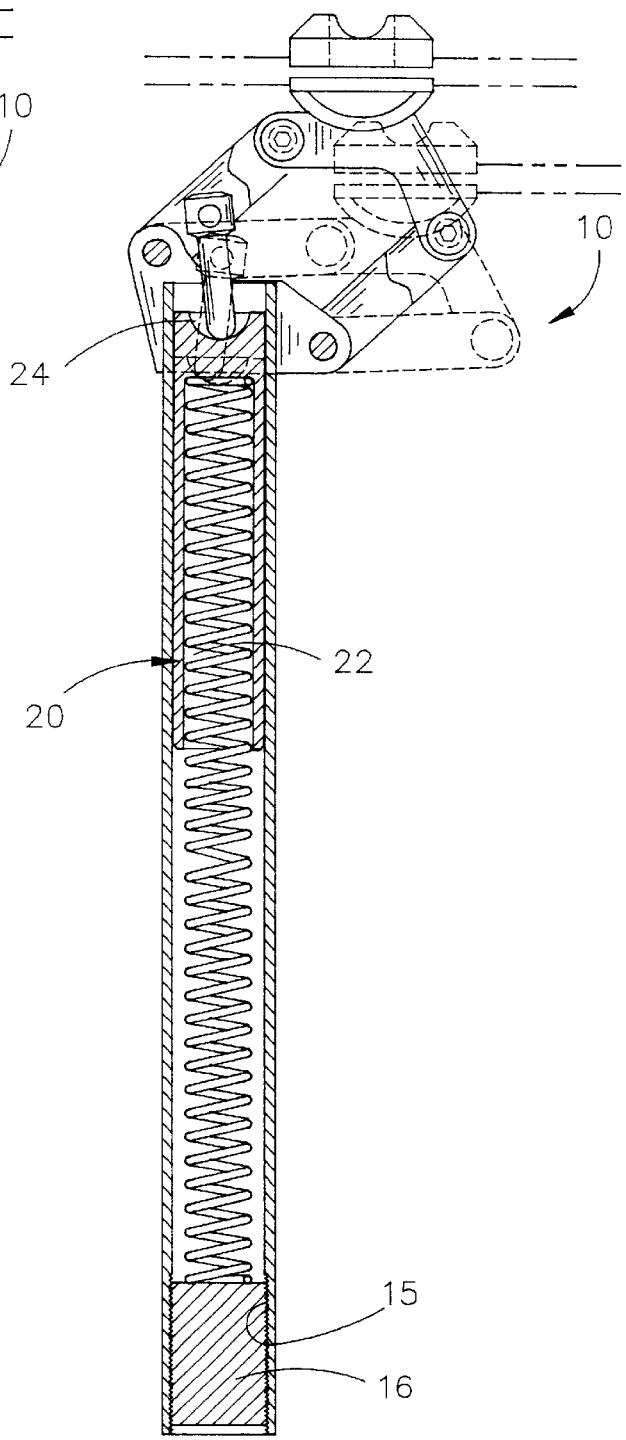
FIG. 6 is a view similar to FIG. 5, but which illustrates the parallel arms and the upper body member in their lowermost position.

As illustrated in FIG. 1, the bicycle seat may be mounted on the mounting means 58 by moving the upper body member 48 from its up position to its down position, as illustrated by broken lines in FIG. 6. An Allen wrench may be inserted through an access hole 66 in the rear parallel arm 44 to secure the seat to the mounting means 48 by tightening the bolt 68. As illustrated, it is desirable to provide the pivoting arrangement with a preload setting which is accomplished by adjustment of the preload end cap 16 so that when the rider is in position, the pivoting structure will occupy the position illustrated by broken lines in FIG. 6.

As the rider strikes bumps or the likes, the downward and rearward movement of the bicycle seat 59 is limited or damped by the fact that the lower end of pin 60 is in engagement with the suspension guide 20 so that the resilient means 18 or damping members will yieldably resist the downward and rearward movement of the seat.

Unlike most pivoting seat posts of the prior art which have the elastomer material between the parallel arms, the structure of this invention places the MCU's down in the seat tube for optimum performance. Maximum adjustability, not just one elastomer option, makes the structure of this invention unique. Leverage ratios are greatly reduced due to the very compact size of the parallel arms and the complete system as a whole. Reduction in size also means less wear on all moving parts. With approximately 65 mm of travel, the structure of this invention provides a unique suspension seat post.

Thus it can be seen that the invention accomplishes all of its stated objectives.

I claim:

1. A pivoting suspension seat post adapted to be inserted into a bicycle frame tube for supporting a bicycle seat thereon, comprising:

a tubular post having upper and lower ends;

a lower body member secured to the upper end of said tubular post and having a forward end, a rearward end, first and second sides, and upper and lower ends;

front and rear parallel arms having upper and lower ends;

said lower end of said front parallel arm being pivotally secured to said lower body member at the upper forward end thereof and extending upwardly and rearwardly therefrom;

said lower end of said rear parallel arm being pivotally secured to said lower body member at the lower rearward end thereof and extending upwardly and rearwardly therefrom;

an angular upper body member having an upper forward end and a lower rearward end;

said upper forward end of said upper body member being pivotally secured to said upper end of said front parallel arm;

said lower rearward end of said upper body member being pivotally secured to said upper end of said rear parallel arm;

seat mounting means on said upper body member;

a resilient means in said tubular post having upper and lower ends;

an elongated pin means having upper and lower ends;

said upper end of said pin means being secured to said front parallel arm between the upper and lower ends thereof;

the lower end of said pin means being in operative engagement with the upper end of said resilient means in said post whereby downward and rearward movement of said upper body member and the seat mounted thereon is yieldably resisted by said resilient means.

2. The seat post of claim 1 wherein said resilient means comprises an elongated, coil spring.

3. The seat post of claim 2 wherein said resilient means also comprises a damping member.

4. The seat post of claim 1 wherein said resilient means comprises a damping member.

5. The seat post of claim 1 wherein a suspension guide is mounted on the upper end of said resilient means; said suspension guide being slidably mounted in said post; said lower end of said pin means being in operative engagement with said suspension guide.

6. The seat post of claim 1 wherein an end cap is adjustably secured to the lower end of said post for preloading said resilient means.

7. The seat post of claim 1 wherein said seat mounting means is adjustable.

8. The seat post of claim 1 wherein pivot pins pivotally connect the upper ends of said front and rear parallel arms to said upper body member and wherein pivot pins pivotally connect the lower ends of said front and rear parallel arms to said lower body member.

9. A pivoting suspension seat post adapted to be inserted into a bicycle frame tube for supporting a bicycle seat thereon, comprising:

a tubular post having upper and lower ends;

a lower body member secured to the upper end of said tubular post and having a forward end, a rearward end, first and second sides, and upper and lower ends;

front and rear parallel arms having upper and lower ends;

said lower end of said front parallel arm being pivotally secured to said lower body member at the forward end thereof and extending upwardly and rearwardly therefrom;

said lower end of said rear parallel arm being pivotally secured to said lower body member at the rearward end thereof and extending upwardly and rearwardly therefrom;

an upper body member having an upper forward end and a lower rearward end;

said upper forward end of said upper body member being pivotally secured to said upper end of said front parallel arm;

said lower rearward end of said upper body member being pivotally secured to said upper end of said rear parallel arm;

seat mounting means on said upper body member;

a resilient means in said tubular post having upper and lower ends;

an elongated pin means having upper and lower ends;

said upper end of said pin means being secured to said front parallel arm between the upper and lower ends thereof;

the lower end of said pin means being in operative engagement with the upper end of said resilient means in said post whereby downward and rearward movement of said upper body member and the seat mounted thereon is yieldably resisted by said resilient means.

10. The seat post of claim 9 wherein said resilient means comprises an elongated, coil spring.

11. The seat post of claim 10 wherein said resilient means also comprises a damping member.

12. The seat post of claim 9 wherein said resilient means comprises a damping member.

13. The seat post of claim 9 wherein a suspension guide is mounted on the upper end of said resilient means; said suspension guide being slidably mounted in said post; said lower end of said pin means being in operative engagement with said suspension guide.

14. The seat post of claim 9 wherein an end cap is adjustably secured to the lower end of said post for preloading said resilient means.

15. The seat post of claim 9 wherein said seat mounting means is adjustable.

16. The seat post of claim 9 wherein pivot pins pivotally connect the upper ends of said front and rear parallel arms to said upper body member and wherein pivot pins pivotally connect the lower ends of said front and rear parallel arms to said lower body member.

* * * * *